Patented Dec. 12, 1950

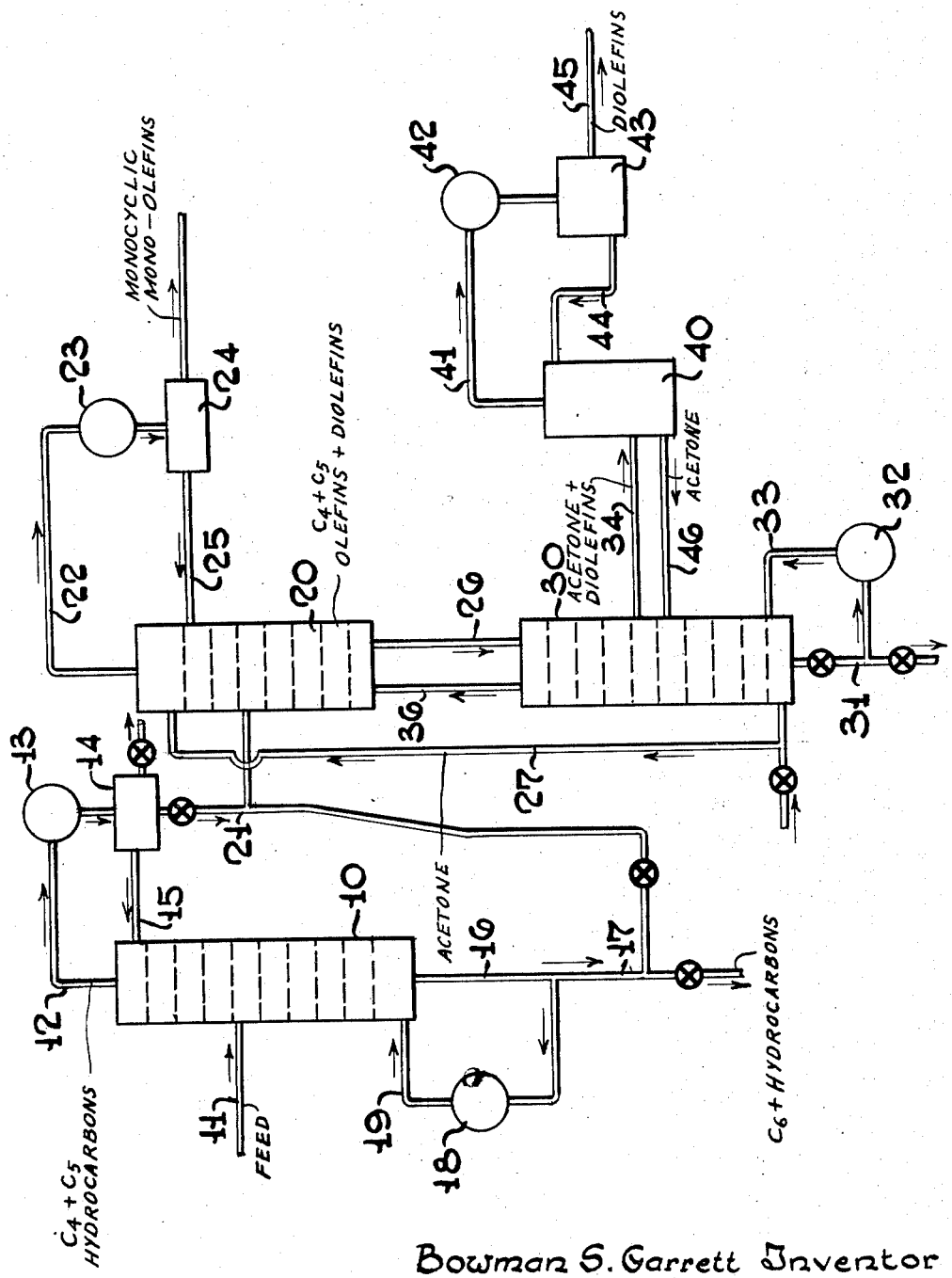

2,534,013

UNITED STATES PATENT OFFICE 2,534,013

DISTILLING POLYMER-FORMING HYDROCARBONS AND REMOVING POLYMER FROM DISTILLATION EQUIPMENT

Bowman S. Garrett, Baton Rouge, La., assignor to The Standard Oil Development Company, a corporation of Delaware Application June 28, 1945, Serial No. 602,120

5 Claims. (Cl. 196—94)

This invention relates to the separation of easily polymerizable compounds from complex hydrocarbon mixtures, and in particular to the removal of polymer contamination from treating equipment.

Fractional and extractive distillations upon easily polymerizable substances such as the lower diolefin hydrocarbons and vinyl compounds are usually beset with complications by reason of the polymer formation interfering with processing. The polymers formed vary according to the material and the polymerization conditions. In general, however, the polymers formed vary in character from being soft, tacky and rubber-like to hard masses which are brittle enough to be pulverized. Polymer formation is objectionable not only from the viewpoint of deterioration of valuable materials but also by reason of the polymer accumulation in heat exchange and other equipment parts which, if allowed to accumulate, often cause complete shutdown of the equipment. The removal of such contaminating polymeric material from processing equipment suitable for continuous use is therefore desirable and particularly important. The present invention is a development in this field.

At the present time, the removal of contaminating polymers is particularly important in regard to processing for the separation and purification of the lower molecular weight diolefins on account of the use of such materials in the preparation of synthetic rubber and resins. Usually, the lower molecular weight unsaturated compounds are separated from easily available complex hydrocarbon mixtures by a combination of fractional and extractive distillations. Polymer formation in such processing is of two general types, namely, the formation of the simpler liquid polymers, the formation of which is not substantially reduced by the addition of polymerization inhibitors; and, secondly, the formation of the more complex solid polymers of rubber consistency, the formation of which is repressed by the addition of polymerization inhibitors. It is a particularly disadvantageous feature that the formation of solid polymers appears to be auto-catalytic and therefore that the presence of traces may be responsible for extensive polymer formation even in the presence of added inhibitors. The present invention is concerned with a convenient method for the removal of polymers unavoidably formed during processing.

The invention has its main field of application in the processing of the easily polymerizable compounds separated from complex hydrocarbon mixtures in which the residual portion of the mixture, after the separation of the desired polymerizable compounds, may be used as a solvent for polymers formed during the processing of the polymerizable compounds. Such processing may be conveniently illustrated by reference to the solvent distillation for the separation of the $C_4$ and $C_5$ diolefins from petroleum distillates obtained from vapor phase cracking of petroleum gas oils. In such processing, a selective solvent for the diolefin hydrocarbon is passed down a fractionation tower. In the presence of the solvent, the diolefin hydrocarbons are selectively dissolved and carried down with the solvent as a solution to the lower part of the tower while the less soluble compounds continue upwards and are finally separated as overhead products. The solvents commonly employed in such separations are those which have selectivity for the more unsaturated hydrocarbons. In such processing, the diolefin hydrocarbons are subjected to a prolonged heating effect and consequently undergo polymerization to form complexes of which the simple type are soluble in the solvent while the more complex are insoluble in the hydrocarbon-solvent mixture. As the polymerization of the solid polymers progresses, precipitation occurs from the solvent-hydrocarbon mixture, especially at the constricted parts of the equipment and on the heat exchange surfaces on which polymerization is accelerated. The deposition of such polymers tends to reduce the heat efficiency and to plug the equipment at the constricted parts. Usually, in the processing according to the present invention, the distillation residue obtained in the fractionation of the hydrocarbon mixture to obtain the feed for the solvent distillation is employed as a solvent wash for the equipment to remove the deposited polymers from the areas upon which deposition has occurred.

Thus, in the separation and purification of the $C_4$ and $C_5$ diolefins from petroleum distillates obtained from the vapor cracking of virgin gas oils, separation by distillation is first made of the diolefins in an overhead stream in concentration as high as can be effected by fractional distillation. The distillation residue contains a high content of aromatics. This material obtained as distillation residue has been found to be a highly advantageous solvent for the solid polymers deposited on the sides of the processing equipment in the extractive distillation of the diolefin overhead fraction. There is, therefore, particular convenience in having the highly aromatic distillation residue as a solvent for the solid polymer in the extractive distillation of the $C_4$ and $C_5$ olefins. However, according to the invention, a solvent material from an extraneous source may also be employed to dissolve the polymers from the sides of the processing equipment. In such cases, the extraneous material is also one which is readily available in the refinery processing of other type materials. Essentially, therefore, the invention is the use of easily available solvent materials from refinery processing for solvent washing the extractive distillation equipment in order to remove polymers deposited on the sides of the equipment as a result of processing.

In order to present a fuller understanding of the invention, processing according to the invention in a particular case will be described and further displayed in the drawing. As feed supply, a typical debutanized distillate stream obtained from the vapor phase cracking of a virgin gas oil stock may be taken. Such a fraction boiling from 90° F. to 400° F. and of the following composition may be taken:

| | Mol. percent |
|---|---|
| Butanes | 0.5 |
| 3-methylbutene-1 | 0.5 |
| Pentene-1 | 9.4 |
| 2-methylbutene-1 | 2.0 |
| Isoprene | 4.1 |
| Trans-pentene-2 | 1.0 |
| Normal pentane | 0.8 |
| Cis-pentene-2 | 1.0 |
| Trimethylethylene (2-methylbutene-2) | 2.2 |
| Cyclopentadiene | 1.3 |
| Transpiperylene | 2.7 |
| Cis-piperylene | 0.2 |
| Cyclopentene | 2.1 |
| Cyclopentane | 0.1 |
| $C_6$ Aliphatics | 11.7 |
| $C_6$ Aromatics | 11.7 |
| $C_7$ | 18.7 |
| $C_8$ | 9.8 |
| $C_9$ | 20.2 |

The feed stock is supplied to fractionating equipment 10 through line 11. The fractionating equipment 10 may be any of the usual forms of fractionating devices such as a column containing bubble cap plates. The equipment is operated usually at pressures somewhat above that of the atmosphere. In the diagram, equipment 10 is shown as being a tower of multiplate construction containing bubble cap plates. In normal operation of processing according to the invention, between 30 and 50 plates are usually employed. The tower is shown as being constructed with an overhead vapor line 12, a condenser 13, a drum 14, a reflux line 15, a bottoms line 16, a reboiler 18 and a reboiler vapor line 19. The distillate product is withdrawn from the distillation system through line 21 and the bottoms product passed through line 17. The pressure upon the system for the treatment of the specific composition given is maintained at about 25 pounds per square inch gauge in order to allow for the employment of normal water supplies for cooling purposes in the condenser 13. The degree of separation in tower 10 is controlled by the heat supplied from the reboiler and the ratio of the reflux supplied through line 15. The reflux ratio is maintained between 4 and 6.

The percentage of feed taken as product through line 21 is adjusted so as to remove the major portion of the isoprene in this fraction while rejecting in the residue higher boiling hydrocarbons of the $C_5$ to $C_9$ range. Thus about 15% of the feed is taken as distillate material. Under these conditions the temperature at the top of the tower is usually about 140° F., while the temperature at the exit line 16 is about 300° F.

The overhead product removed through line 12 consists of a narrow $C_5$ fraction containing most of the isoprene in the feed stock. The entire distillate is condensed in equipment 13 and passed to the drum 14. From the drum 14 a quantity of reflux is passed through line 15 in order to maintain the desired operating conditions. The remainder of the condensed distillate is withdrawn from the drum 14 and passed through line 21 for further processing. The ratio of reflux to product is between 4 and 6, depending on the feed stock. In the processing of the feed stock of the specific illustration, the composition of the distillate material under the particular operating conditions given shows the following analysis:

| | $C_5$ Fraction, Mol. percent |
|---|---|
| Butanes | 2.4 |
| 3-methylbutene-1 | 2.4 |
| Pentene-1 | 39.2 |
| 2-methylbutene-1 | 10.0 |
| Isoprene | 22.7 |
| Trans-pentene-2 | 4.8 |
| Normal pentane | 3.9 |
| Cis-pentene-2 | 4.8 |
| Trimethylethylene (2-methylbutene-2) | 5.3 |
| Cyclopentadiene | 3.0 |
| Transpiperylene | 1.5 |
| Cis-piperylene | 0.0 |
| Cyclopentene | 0.0 |
| Cyclopentane | 0.0 |

The residual material, consisting of heavier $C_5$, $C_6$ and higher boiling hydrocarbons, is withdrawn through line 16. A portion of the residue is passed to the reboiler 18 where it is vaporized in order to supply the heat necessary to operate the tower, the vapor being returned to the tower 10 through line 19. The remainder of the high boiling material is removed from the system through line 17 for use as subsequently to be described.

The overhead fraction from the tower 10 as removed through line 21 is passed to the fractionating tower 20. The tower 20 is similar in design to tower 10 and may be any type of suitable fractionating equipment, preferably a bubble cap tower containing about 50 plates. The tower 20 is furnished with an overhead vapor line 22, a condenser 23, a drum 24, a reflux line 25, a bottoms line 26, and a solvent supply line 27. Through line 27, the solvent, for example, acetone containing about 10% of water, is passed into the system in the ratio of between 2 or 3 volumes of solvent to 1 volume of hydrocarbon in order to remove the non-cyclic monoolefins as overhead. The overhead fraction removed from the system through line 22 is condensed in equipment 23 and collected in drum 24. A portion of the condensate is employed as reflux through line 25, while the remainder is passed to washing and distillation equipment, not shown, for the recovery of the solvent and the hydrocarbon contents as considered commercially necessary. The pentadiene-rich mixture is withdrawn from near the bottom of tower 20 through line 26 and passed into the top of tower 30. The tower 30 is a distillation tower similar to tower 20 except that it has a reboiler system consisting of line 31, reboiler 32 and return vapor line 33. Passing overhead from the tower 30 through line 36 into the bottom of tower 20 are the higher boiling constituents, while as distillation residue there is obtained relatively pure solvent, which is recycled to the top of tower 20 through line 27 as stated hereinabove. The heat required to operate the towers 20 and 30 is maintained by the reboiler system attached to the lower part of tower 30. From about the center of the tower 30 a side stream is taken through line 34 and passed to distillation tower 40.

Tower 40 is a distillation tower of customary construction. In this tower, separation of the hydrocarbons from the solvent is effected. As overhead from the tower 40, through line 41, is obtained a mixture of isoprene, transpiperylene and cyclopentadiene in high concentration, and said mixture is condensed in equipment 42 and passed to drum 43. A portion of this distillate material is returned to the tower 40 through line 44 as reflux, while the remainder is passed through line 45 to distillation equipment for the further separation and purification of the isoprene. The distillation residue from the tower 40 is passed through line 46 back into tower 30.

After processing in the towers 20 and 30 for some time for the separation of the diolefin stream containing the isoprene and transpiperylene in high concentration as obtained through line 34, the feed supply to the tower 20 is interrupted. The towers 20 and 30 are then drained and the material obtained as distillation residue from the tower 10 is passed through line 17 into the feed supply line 21 and thus into the tower 20. After a normal operating level is established in the bottom of the tower 20, the flow is started from the bottom of the tower to the top of tower 30. When the normal operating level is established in tower 30, the contents of this tower are recycled to the top of tower 20 and sufficient steam is fed to the reboiler system at the bottom of tower 30 to maintain a temperature in the tower of about 150° F. When circulation is started, a stream of the wash material equivalent to the amount fed to the tower 20 is removed from the system. Circulation and washing of the equipment with the remaining material is continued until samples of the wash material give only faint cloudiness when diluted with an equal volume of solvent, indicating that the solvent wash material has ceased to dissolve polymer. The solvent wash material is removed from towers 20 and 30 in the same way as was the solvent hydrocarbon mixture originally present in the towers.

The uniqueness of such processing in the particular embodiment is that the wash material as removed from towers 20 and 30 can be advantageously passed through filtering equipment to remove the polymers and the thus filtered material passed to storage tanks for blending with other naphtha materials in the preparation of high octane rating gasolines. Also, the processing is advantageous when the solvent washing of the processing equipment is carried out before the polymer has become of high molecular weight. When the polymer is the product of intensive polymerization, solubility in the distillation residue from the preliminary fractionation of the feed stock is small and thus the uniqueness of being able to use the distillation residue decreases as the complexity of the polymer increases. It is therefore advisable to interrupt the processing before too high polymers are formed. In the latter case, however, solvents having a greater solvency for the polymer dependent on the size of the processing equipment have then to be used. Such solvents are those of substantially higher boiling point and of paraffinic character such as the raffinate material from the sulfur dioxide treatment of kerosene stocks.

What is claimed is:

1. An improved method of removing polymer contamination from distillation equipment employed in the distillation of easily polymerizable hydrocarbons initially distilled from complex hydrocarbon mixtures wherein higher boiling hydrocarbons remain as a residual portion which comprises interrupting periodically the distilling of the said easily polymerizable hydrocarbons being carried out in said equipment, then passing through the said equipment a portion of the residual higher boiling complex hydrocarbons mixtures, initially separated by distillation, until the exit stream is substantially free from polymer content.

2. An improved method of removing polymer contamination from distillation equipment employed in the separation of $C_4$ and $C_5$ diolefins from a cracked petroleum distillate fraction consisting essentially of $C_4$ and $C_5$ mono-olefins and diolefins, which comprises distilling the diolefins from a fraction of $C_4$ and $C_5$ mono-olefins and diolefins, withdrawing from the distillation equipment the fraction consisting essentially of the $C_4$ and $C_5$ mono-olefins and diolefins, and then passing through said equipment, paraffinic hydrocarbons boiling up to about 400° F., and substantially free of $C_4$ and $C_5$ hydrocarbons, until the exit stream is substantially free of polymer content.

3. An improved method of removing polymer contamination from distillation equipment employed in the separation of $C_4$ and $C_5$ diolefins from a mixture thereof obtained by first fractionally distilling off $C_4$ and $C_5$ hydrocarbons from a cracked petroleum distillate boiling from 90° F. to 400° F. containing said $C_4$ and $C_5$ hydrocarbons with higher boiling hydrocarbons so as to leave a residue substantially free of the $C_4$ and $C_5$ hydrocarbons distilled from said cracked petroleum distillate, which comprises distilling off the $C_4$ and $C_5$ hydrocarbons from said mixture for a period during which polymer contamination accumulates in the distillation equipment wherein the $C_4$ and $C_5$ hydrocarbons are distilled, drawing off distillation condensates consisting of $C_4$ and $C_5$ hydrocarbons from the distillation equipment, then, during an interval prior to a subsequent distillation of $C_4$ and $C_5$ hydrocarbons from said mixture, passing through said equipment a portion of said residue from the cracked petroleum distillate which has been freed of the $C_4$ and $C_5$ hydrocarbons until an exit stream of said residual portion is substantially free of polymer content.

4. An improved method of removing polymer contamination from the distillation equipment according to claim 3 in which the distillation condensates consisting of $C_4$ and $C_5$ hydrocarbons are obtained by distilling the $C_4$ and $C_5$ hydrocarbons from said mixture thereof in the presence of a solvent.

5. An improved method of removing polymer contamination from distillation equipment according to claim 3 in which the distillation condensates consisting of $C_4$ and $C_5$ hydrocarbons are obtained by solvent distillation of the $C_4$ and $C_5$ hydrocarbons from the mixtures thereof in the presence of aqueous acetone containing about 10% water in the amount of between 2 and 3 volumes of aqueous acetone to one volume of the hydrocarbons present therewith.

BOWMAN S. GARRETT.

No references cited.